United States Patent
Heinzl

(10) Patent No.: US 11,794,393 B2
(45) Date of Patent: Oct. 24, 2023

(54) ABRUPT EJECTOR PLATE STOP

(71) Applicant: Aptiv Technologies Limited, St. Michael (BB)

(72) Inventor: Klaus Heinzl, Rechnitz (AT)

(73) Assignee: Aptiv Technologies (2) S.à r.l., Luxembourg (LU)

( * ) Notice: Subject to any disclaimer, the term of this patent is extended or adjusted under 35 U.S.C. 154(b) by 0 days.

(21) Appl. No.: 17/114,616

(22) Filed: Dec. 8, 2020

(65) Prior Publication Data

US 2021/0213661 A1   Jul. 15, 2021

(30) Foreign Application Priority Data

Jan. 13, 2020 (EP) ..................................... 20151449

(51) Int. Cl.
*B29C 45/40* (2006.01)
(52) U.S. Cl.
CPC .................... *B29C 45/401* (2013.01)
(58) Field of Classification Search
CPC .................................................... B29C 45/401
See application file for complete search history.

(56) References Cited

U.S. PATENT DOCUMENTS

| | | | |
|---|---|---|---|
| 5,359,764 A | 11/1994 | Sasaki et al. | |
| 6,145,578 A * | 11/2000 | Zearbaugh | B22D 17/24 |
| | | | 164/347 |
| 6,206,682 B1 | 3/2001 | Vovan | |
| 2011/0193266 A1* | 8/2011 | Fukuta | B29C 45/401 |
| | | | 425/556 |
| 2018/0147763 A1* | 5/2018 | Sorimoto | B29C 45/401 |

FOREIGN PATENT DOCUMENTS

| | | | |
|---|---|---|---|
| CN | 202595351 U | * | 12/2012 |
| CN | 203792652 U | * | 8/2014 |
| CN | 108189331 A | * | 6/2018 |
| CN | 108724652 A | | 11/2018 |
| EP | 3274149 B1 | | 3/2019 |

(Continued)

OTHER PUBLICATIONS

Machine translation KR20150143126A (Year: 2015).*

(Continued)

*Primary Examiner* — Matthew J Daniels
*Assistant Examiner* — Wayne K. Swier
(74) *Attorney, Agent, or Firm* — Billion & Armitage

(57) ABSTRACT

An ejector for a molding machine includes an ejector plate and an ejector rod. The ejector plate has an opening and a distance block attached to the ejector plate. The ejector rod includes a first and a second end portion. The first end portion is in the opening of the ejector plate. The ejector rod has a first initial position relative to the ejector plate. The first end portion of the ejector rod is pushed in the direction of the ejector plate by a first force applied to the second end portion of the ejector rod. The ejector also includes a spring around the first end portion of the ejector rod and coupled to the ejector plate. The spring is configured to provide a second force to the ejector plate upon application of the first force to the second end portion of the ejector rod. There is always a gap between the first end portion of the ejector rod and the ejector plate.

15 Claims, 4 Drawing Sheets

(56) References Cited

FOREIGN PATENT DOCUMENTS

| | | |
|---|---|---|
| JP | H08216203 A | 8/1996 |
| JP | 3592793 B2 | 9/2004 |
| KR | 20150143126 A | 12/2015 |

OTHER PUBLICATIONS

Machine translation CN108724652A (Year: 2018).*
Machine translation CN203792652U (Year: 2014).*
Machine translation CN20259535U (Year: 2012).*
Machine translation CN108189331A (Year: 2018).*
Extended European Search Report for EP Application No. 20151449.4, dated Jul. 13, 2020, 10 pages.
Chinese Office Action for Application No. 2021100081418 dated Jul. 28, 2022.

* cited by examiner

ABRUPT EJECTOR PLATE STOP

CROSS-REFERENCE TO RELATED APPLICATION

This application claims benefit of priority to European Patent Application No. 20151449.4 filed in the European Patent Office on Jan. 13, 2020, the entire disclosure of which is hereby incorporated by reference.

TECHNICAL FIELD

The current application relates to an ejector for an injection molding machine.

BACKGROUND

Injection molding machines are used for producing molded parts of various shapes in an automated fashion. Molding machines comprise two plates, which when assembled, for example being placed over each other, form a cavity, into which a molten material, like plastic or resin, can be injected and hardened. For this purpose, the shape of the cavity depends on the form of the to be molded part. For example, the cavity may form the outer surface of the molded part, thereby forming a negative of the molded part. It can also be said that the cavity is a counter part to the to be molded part. The cavity thereby can be formed completely in the cavity plate or at least partially in the cavity plate and partially in the core plate. After the molten material is hardened or cured, the two plates are disassembled from one another, such that the molded part can be removed from the cavity.

Disassembling the two plates of the molding machine is performed by separating the plates by moving them relatively to one another. Although it would be possible to move both plates at the same time, in most molding machines only one plate, which is referred to as the moving plate, is moved away from the other plate, which is referred to as the stationary plate. The moving plate may also be referred to as a core plate, while the stationary plate is referred to as a cavity plate.

The cavity plate comprises the injection means for injecting the molten material into a cavity formed between the cavity plate and the core plate, when the core plate and the cavity plate are in contact with each other. The cavity has a shape, which depends on the shape of the desired molded part.

After injection and hardening of the molded part, the core plate is separated from the cavity plate. Upon separation of the core plate, the molded part may fall off the plates into a collecting means. However, sometimes, the molded parts do not fall off, but remain attached to the core plate. In order to remove the molded part from the core plate, the core plate comprises an ejector, which applies a force to the molded part, which allows the molded part to be detached from the core plate. For example, the ejector may comprise an ejector plate and at least one ejector pin attached to the ejector plate, which pushes the molded part away from the core plate, such that it will be detached from the core plate. Upon operation of the ejector, the ejector plate will be moved relatively to the core plate.

The person skilled in the art will appreciate that a molding machine may mold multiple parts at the same time by providing multiple cavities between the cavity plate and the core plate. In this case, the ejector works to detach the multiple parts. For example, the ejector may comprise multiple ejector pins each associated with one cavity formed between the two plates. Accordingly, the present disclosure is intended to apply to a molding machine providing any number of molded parts.

However, during operation, the molded part sometimes does not fall off, even when an ejector is used. This may be due to the fact that the molded part adheres or attaches to the ejector pin and can therefore not fall off the ejector pin. In order to solve this problem, the ejector performs multiple ejector strokes. With each ejector stroke, the ejector pushes the ejector pin against the molded part, in order to increase the chance that the molded part will fall off the plate and/or the ejector pin. However, because multiple ejector strokes are performed, the efficiency of the molding machine is reduced. Since it is not known how many ejector strokes are required, the ejector performs a predetermined number of ejector strokes, which takes time and lengthens the operating cycle of the molding machine.

Furthermore, during each ejector stroke, the ejector plate to which the at least one ejector pin is attached moves back and forth. At the turning points of the back and forth motion, an abrupt stop of the ejector plate motion occurs. In case that the ejector is driven by an electric motor, this abrupt stop causes the electric motor to stop abruptly. Such an abrupt stop of the electric motor causes an undesired force on the motor, which may damage the motor. Also, an electric motor is named here as an example, the person skilled in the art will understand that also other motors may suffer from abrupt stops.

Hence, there is a need in the art for improving ejectors in molding machines and providing a process-reliable ejection of molded parts preferably on the first stroke of the ejector, with an abrupt stop of the ejector plate, but without causing an abrupt stop of the motor.

BRIEF SUMMARY

The above-mentioned need is fulfilled by the ejector according to the present disclosure. According to the present disclosure, the stroke of the ejector is restricted by reducing the available distance of an ejector plate for each ejector stroke and providing an ejector rod, which can move at least some distance freely in respect to the ejector plate.

An ejector according to the present disclosure may be configured for use in a molding machine, wherein the molding machine comprises a core plate and a cavity plate. In the molding machine, the core plate and the cavity plate may each comprise a first side with a front surface, which face each other, and which may be pushed together to form a cavity between both plates. Hence, it can be said that the front surfaces of the plates from a cavity. In order to achieve this, one or both of the two plates may comprise a part of a means for forming a cavity. For example, one or both plates may comprise a recess in a form of the to be molded part. If the two plates are pushed together, they will form a cavity between them, in which molten material can be filled to form the molded part. The form of the cavity depends on the shape of the part, which shall be molded. Preferably, the cavity is a negative of the molded part.

Inside a molding machine, the ejector may be attached to the core plate, wherein the ejector may be removably attached to the core plate. Preferably, the ejector is located at least partially within the core plate and is located in such a way that a surface of the ejector plate faces the backside of the front surface of the core plate. In other words, the ejector is located on the opposite side of the front surface of the core plate. The ejector is at least partially movable within the core plate. For the need of this application, the term backside of the front surface of the core plate refers to the part of the core plate towards which the ejector is moved in order to eject the molded parts. For example, the front surface of the core plate is used to be pushed against the front surface of the cavity plate, so that both front surfaces form at least one cavity. After molding and detachment of the core plate and the cavity plate, the ejector, which is located at least partially within the core plate, pushes the molded parts off the front surface of the core plate, therefore the ejector moves closer to the first side of the core plate, i.e. closer to the front surface. Since the ejector is located at least partially inside the core plate, the ejector is placed behind the front surface and can therefore be moved towards the backside of the front surface and away from it.

According to the present disclosure, the ejector comprises an ejector plate. The ejector plate may comprise one or more plate portions. If the ejector plate comprises more than one plate portion, the respective plate portions may be force-fittingly attached to one another or attached by other means, thereby forming the ejector plate. Further, the ejector plate comprises an opening. In some embodiments, the opening may be a recess. In other embodiments, when the ejector plate comprises two or more plate portions, the opening may be a recess in an exterior plate portion or may extend through the entire thickness of said exterior plate portion. For example, the ejector plate may comprise two plate portions, wherein a first plate portion faces the first side of the core plate or the backside of the front surface of the core plate and a second plate portion is averted from the first side of the core plate. Then, the opening may be a recess in the second plate portion or may be a hole extending through the entire thickness of the second plate portion. In this example, each of the first plate portion and the second plate portion may be referred to as exterior plates. However, in case that the ejector plate may comprise three or more plate portions, a third plate portion may be inserted between the first and the second plate portions. Then the first and the second plate portions may still be referred to as exterior plate portions, wherein the third plate portion, which is located between the first and second plate portions, may be referred to as interior plate portions.

Preferably, the ejector comprises at least one ejector pin extending from the ejector plate. Preferably, the core plate comprises at least one opening between the front surface, in particular the location where the core plate and the cavity plate form the cavity for molding, and the location of the ejector and the at least one ejector pin extends from the ejector plate at least partially through the opening of the core plate.

Further, the ejector comprises a distance block. The distance block is attached to the ejector plate. Preferably, the distance block is attached to the ejector plate at the side, which faces the backside of the front surface of the core plate. Thereby, the distance block may reduce the available distance for motion of the ejector within the core plate. In particular, the ejector plate may only move towards the backside of the front surface of the core plate until the distance block contacts the backside of the front surface of the core plate. This exhibits the advantage of an abrupt stop of the ejector plate, in order to allow for a sudden impulsive stroke of the ejector plate.

The ejector further comprises an ejector rod. The ejector rod is used for applying a force onto the ejector. For this purpose, the ejector rod may be coupled to a moving means of the molding machine. The moving means may for example be a motor, preferably an electric motor. However, the person skilled in the art will recognize that also any other means for moving the ejector rod can be used. The ejector rod comprises a first end portion and a second end portion. The first end portion is located in the opening of the ejector plate. The ejector rod is configured for being pushed into the opening and towards the ejector plate by a first force applied to the second end portion of the ejector rod. Before applying the force to the ejector rod, the ejector rod will be in a first initial position relative to the ejector plate.

Further, the ejector comprises a spring, which is placed around the first end portion of the ejector rod and is coupled to the ejector plate. Upon applying a first force to the ejector rod, the spring is configured to provide a second force to the ejector plate. The second force causes a motion of the ejector plate. By applying the first force to the spring, the spring will be compressed. Preferably, the spring will be compressed between a portion of the ejector rod and the ejector plate. A compression of the spring then causes the second force onto the ejector plate. The person skilled in the art will appreciate that the spring does not need to be attached to the ejector plate. In a preferred example, it is sufficient that the spring will be coupled to the ejector plate by contact, when the spring is pushed against the ejector plate and compressed between the ejector rod and the ejector plate.

Upon compression of the spring, the spring may also be configured to provide a restoring force to the ejector rod. The restoring force may prevent the first portion of the ejector rod from impacting on the ejector plate. Further, the restoring force may also cause the ejector rod to return to the first initial position. Since the spring will be compressed between the ejector rod and the ejector plate caused by the first force applied to the ejector rod, the restoring force is directed in the opposite direction as the force applied to the ejector rod.

The ejector further comprises a gap between the first end portion of the ejector rod and the ejector plate at any time. In this regard, the term "at any time" means that at any instance during the operation of the ejector. For example, the ejector rod will be pushed towards the ejector plate upon application of the first force. The first force will compress the spring and cause a second force onto the ejector plate, which will move the ejector plate. The ejector plate will move within the core plate until the distance block contacts the backside of the front surface of the core plate, causing an abrupt stop. Since the ejector rod is coupled to the ejector plate via the spring, the ejector rod itself will not experience an abrupt stop and will continue to move relative to the ejector plate, thereby reducing the size of the gap between the first end portion of the ejector rod and the ejector plate. The size can also be referred to as the distance between the first end portion of the ejector and the ejector plate. This distance is always a non-zero distance. This gives the motor the opportunity to run further and retreat the ejector rod from the ejector plate without stopping abruptly when the distance block contacts the backside of the front surface of the core plate. Hence, the gap allows a decoupling of the motion of the ejector rod, which may be directly connected to the moving means, and the motion of the ejector plate relatively to the core plate. Therefore, an abrupt stop of the ejector plate is possible without causing an abrupt stop of the motor. The gap between the ejector plate and the first end portion of the ejector rod may be reduced to a minimum, which is non-zero. In a preferred example, the minimum may be 2 mm or even less. With other words, it can also be said, the ejector rod moves indirectly the ejector plate by ease of the spring coupling between the ejector rod and the ejector plate. This indirect coupling means, that the ejector rod does not come into contact with the ejector plate.

If the spring will be compressed by a particular amount, the restoring force provided by the spring will exceed the first force applied to the ejector rod. Then, the spring may cause the ejector rod to return to the first initial position, for example by pulling the ejector rod away from the ejector plate, thereby counteracting the first force, which pushes the ejector plate towards the first side of the core plate.

In a preferred example, the operation of the moving means may be synced to the forces acting on the ejector. For example, the restoring force provided by the spring may support the moving means in retreating the ejector rod from the ejector after the stroke.

Preferably, the spring has a high spring rate. In this regard, the term "high" refers to a comparison to spring rates of other springs, which may be used in a molding machine. For example, at least one other spring may be attached to the ejector plate to keep the ejector plate in an initial position when no force is applied to the ejector rod. Compared to this at least one other spring, the spring placed around the first end portion of the ejector rod may have a spring rate, which is at least twenty percent higher. If multiple other springs are used to keep the ejector plate in its initial position, the spring rate of the spring around the first end portion of the ejector rod may have a spring rate, which is at least twenty percent higher than the sum of the spring rates of the other springs. A high spring rate is beneficial because this will end in a short stroke of the ejector and will prevent the first end portion of the ejector rod from contacting the ejector plate and avoiding undesired forces onto the moving means. Hence, a sudden impulsive stroke is carried out. Because of the sudden impulsive stroke of the ejector and the abrupt stop of the ejector plate, the molded parts will not adhere or become attached to the at least one ejector pin and will therefore fall off the core plate upon first stroke of the ejector.

In a preferred embodiment, the gap between the first end portion of the ejector rod and the ejector plate reduces in size, i.e. the distance between the first end portion of the ejector rod and the ejector plates is reduced, when the ejector rod is moved from the first initial position in the direction of the ejector plate. The ejector plate may comprise a first plate portion and a second plate portion, wherein the second plate portion comprises the opening of the ejector plate and wherein the gap is located between the first end portion of the ejector rod inside the opening and the first plate portion of the ejector plate. The ejector rod may be movable within the opening of the second plate portion towards the first plate portion or away from the first plate portion, respectively, and a motion of the ejector rod within the second plate portion may cause a reduction of the gap when the ejector rod is moved towards the first plate portion or an increase of the gap when the ejector rod is moved away from the first plate portion.

In a further preferred embodiment, the first end portion of the ejector rod is formed by a bolt, which is attached to the ejector rod. This attachment may be reversible. The bolt may be attached to the ejector rod via a disk. The spring, which is placed around the first end portion, may then be located around the bolt between the ejector plate and the disk, such that it is trapped between the second plate portion and the disk. Trapping the spring between the second plate portion and the disk allows for defining the compression ratio of the spring precisely.

The above-mentioned need in the art may also be overcome by a molding machine according to the present disclosure. The molding machine comprises a core plate and a cavity plate. The core plate and the cavity plate may each comprise a first side with a front surface, which face each other, and which may be pushed together to form a cavity between both plates.

The core plate comprises a first part of a means for forming a cavity. The first part of the means for forming a cavity is configured to form a cavity with a corresponding second part of the means for forming a cavity, which is part of the cavity plate. Further, the core plate comprises an ejector according to the present disclosure as has been described in detail above.

The cavity plate comprises a second part of the means for forming a cavity. The first part and the second part form a cavity between the core plate and the cavity plate, when the core plate and the cavity plate are pushed together. The cavity may form a negative of the molded part.

Further, the cavity plate comprises a means for injecting molten material, for example molded plastic, into the cavity. Additionally, the cavity plate may comprise a cooling means, which is configured for cooling the injected material, which will shorten the hardening process of the molten material.

In a preferred embodiment, the cavity plate is fixed within the molding machine and the core plate is movable relative to the cavity plate. This reduces the number of movable parts within the molding machine.

The above-mentioned need in the art may also be overcome by a method according to the present disclosure. The method comprises providing a first force to an ejector rod of an ejector, wherein the ejector rod comprises a first end portion and is indirectly coupled to an ejector plate. The first force may be provided to the ejector rod by connecting the ejector rod to a moving means of a molding machine.

Further, the method comprises compressing a spring attached to a portion the ejector rod, wherein the compressing is caused by the first force. The first force causes a motion of the ejector rod and the motion of the ejector rod may cause a compression of the spring. For example, the spring may be connected between the ejector rod and the ejector plate or may be placed between the ejector rod and the ejector plate and may be compressed by being pushed against the ejector plate by the motion of the ejector rod. Applying a force to the ejector rod, which moves the ejector rod into the proximity of the ejector plate causes a compression of the spring.

Also, the method comprises, by compressing the spring, providing a second force to the ejector plate and thereby moving the ejector plate and upon providing the first force to the ejector rod, reducing a size of a gap between the first end portion of the ejector rod and the ejector plate to a minimum, which is non-zero. In this regard, the first end portion may be moved towards the ejector plate and thereby closing the gap to a minimum but will not contact the ejector plate. The minimum may be for example 2 mm or even less. In other words, the ejector rod may be indirectly coupled to the ejector plate by ease of the spring. When the first force is applied to the spring by moving the ejector rod, the spring will exert a force upon the ejector plate, which will move the ejector plate. The spring and its restoring force will also ensure that the ejector rod does not contact the ejector plate. The gap, or distance, between the first end portion of the ejector rod and the ejector plate is thereby at all times kept to a non-zero value, such that although the ejector plate is stopped abruptly, the ejector rod can still move some distance without impacting on the ejector plate. This ensures that although the ejector plate is stopped abruptly, the moving means, for example an electric motor, moving the ejector rod is not stopped abruptly.

Preferably, at least one ejector pin is attached to the ejector plate and the method comprises moving the at least ejector pin into a means for forming a cavity of a molding machine, the moving the at least one ejector pin is caused by moving the ejector plate. If a molded part is attached to the means for forming a cavity, the ejector pin may be moved against the molded part and may separate the molded part from the means for forming a cavity.

Further, the method may comprise limiting the moving of the ejector plate of the ejector by providing a distance block, which is attached to the ejector plate. Providing such a distance block reduces the movability of the ejector block, because the motion will stop once the distance block encounters an obstacle. The obstacle may, for example, be the backside of the front side of the core plate. Thereby, the distance block may for example reduce the motion of the at least one ejector pin into the means for forming a cavity. Accordingly, a distance block in combination with a spring may allow a sudden impulsive stroke, without an abrupt stop of the means for moving the ejector rod.

Further, the method may comprise providing, by the spring, a restoring force to the ejector rod, wherein the restoring force is directed opposite to the first force and increasing the size of the gap by a motion of the ejector rod caused at least partially by the restoring force provided by the spring. Thereby, the spring may support the moving means in retreating the ejector rod from the ejector plate and returning to an initial position. Once the ejector rod is in its initial position, the moving means may cause the motion of the ejector once again, meaning that the method returns at the start.

BRIEF DESCRIPTION OF THE DRAWINGS

The present invention will now be described, by way of example with reference to the accompanying drawings, in which:

FIGS. 1a, 1b show cross-sectional views of an embodiment of a core plate with an ejector according to an embodiment, wherein FIG. 1a shows an initial position of the ejector rod and the ejector plate, whereas FIG. 1b shows a ejector plate, which is moved within the core plate;

In the drawings, like reference characters generally refer to the same parts throughout the different drawings. The drawings are not necessarily to scale, emphasis instead generally being placed upon illustrating the principles of the invention.

DETAILED DESCRIPTION

The following description and the annexed drawings set forth in detail certain illustrative aspects of the apparatus and the method described above. These aspects are indicative, however, of but a few of the various ways in which the principles of various embodiments can be employed and the described embodiments are intended to include all such aspects and their equivalent.

The following detailed description refers to the accompanying drawings that show, by way of illustration, specific details, and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1A:
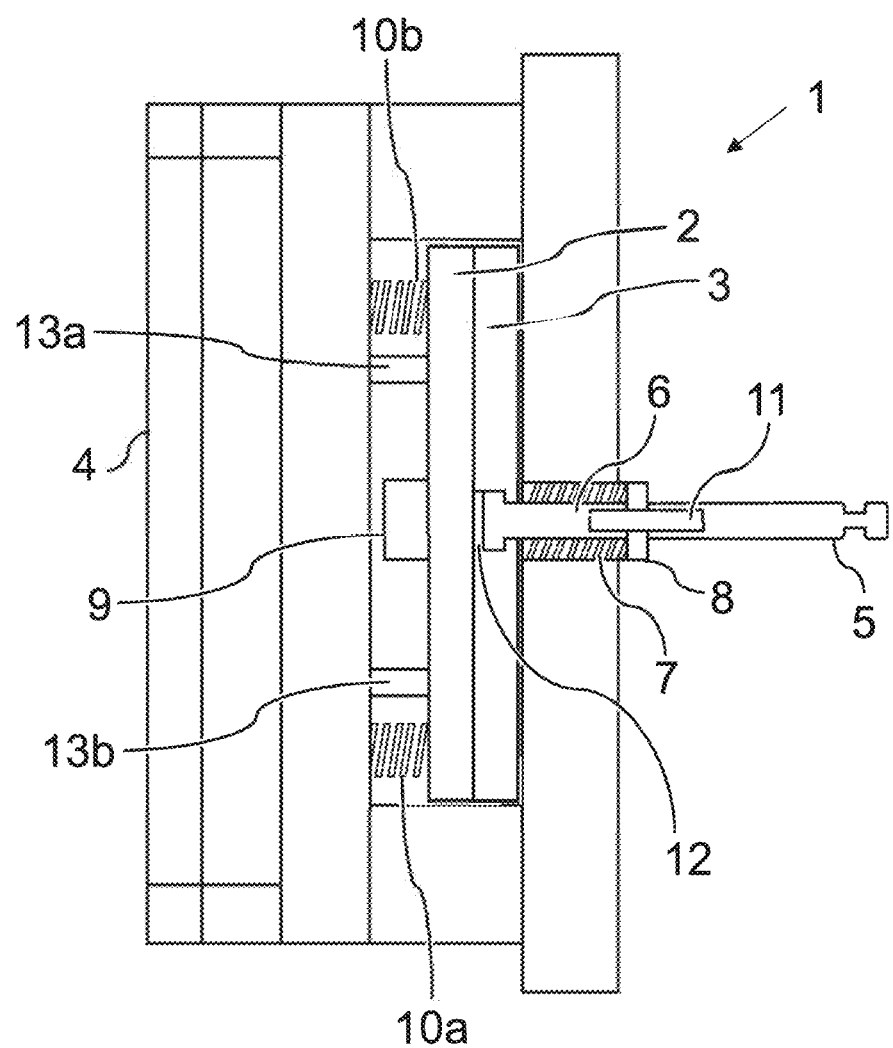

FIG. 1a shows a cross-sectional view of an embodiment of a core plate with an ejector according to the present disclosure.

The ejector is located within a core plate 1. The core plate 1 has a first side with a front surface 4, which is pushed against a cavity plate upon operation in a molding machine. The ejector comprises a first plate portion 2 and a second plate portion 3, which together can be referred to as ejector plate. The first and second plate portions 2, 3 are movable within the core plate 1, hence the ejector plate is moveable within the core plate 1. Ejector pins 13a, 13b are attached to the first plate portion 2 and are placed in an opening of the core plate (not shown), which extends from the location of the ejector inside the core plate to the front surface 4 and is used to push molded parts off the core plate 1 upon a corresponding motion of the ejector within the core plate 1.

Figure 1B:
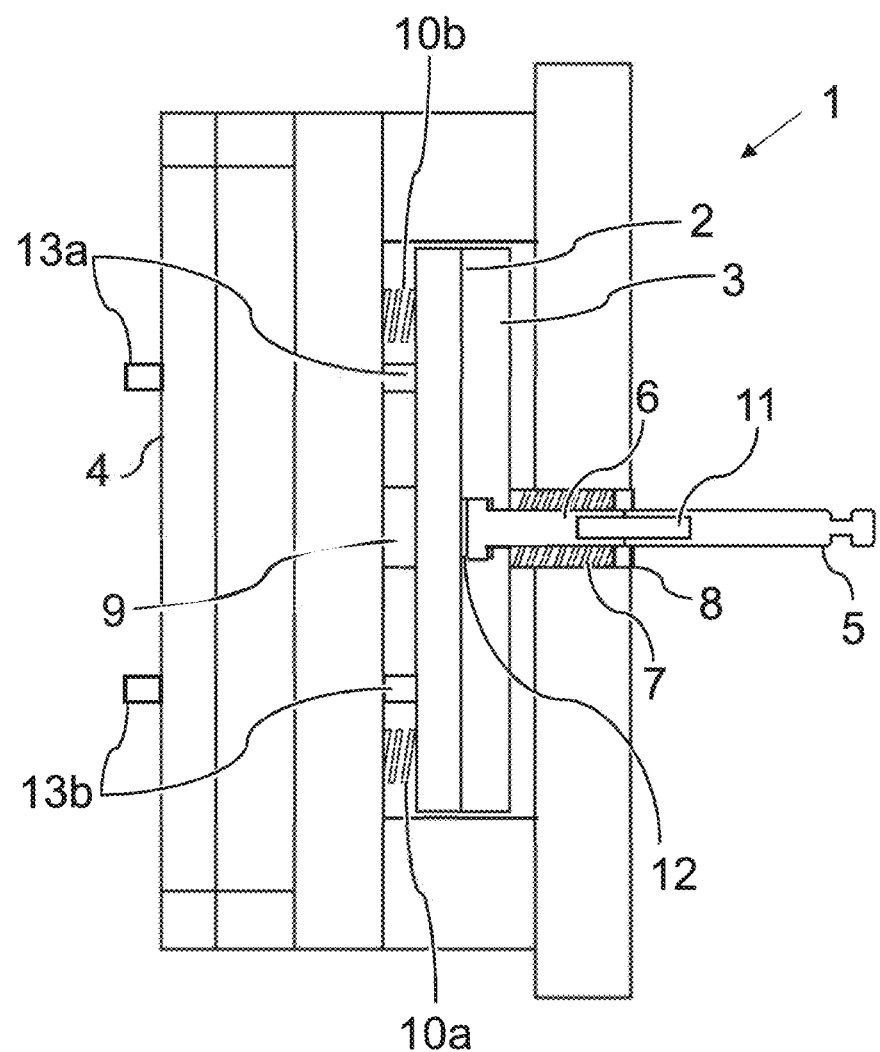

FIG. 1a shows the ejector plate in an initial position. The initial position corresponds to a position with retracted ejector pins 13a, 13b. To bring the ejector plate into the initial position and keep it there, the core plate 1 comprises springs 10a, 10b, which are attached to the first plate portion 2. FIG. 1b shows the ejector plate, which is moved within the core plate 1 upon ejector stroke. Accordingly, the ejector pins 13a, 13b are pushed through the front surface 4 of the first side of the core plate 1.

The ejector plate is movable within the core plate 1. A distance block 9 is attached to the first plate 2 to restrict the motion of the ejector plate. Further, the distance block 9 also provides an abrupt stop of the ejector motion, when the distance block 9 impacts on the backside of the front surface 4, as is depicted in FIG. 1b.

The second plate portion 3 comprises an opening. A first end portion 6 of an ejector rod 5 is located in the opening. The ejector rod 5 may be coupled to an electric motor of a molding machine or any other means (not shown), which are able to move the ejector rod 5. These means may also be referred to as a moving means. In the embodiment depicted in FIGS. 1a, 1b, the first end portion 6 is formed by a bolt, which is coupled to the ejector rod 5 via an insert 11 and a disk 8. The moving means may apply a first force to the ejector rod 5, which pushes the ejector rod 5 into the core plate 1, thereby translating the force from the ejector rod 5 to the bolt. Accordingly, the bolt will be pushed inside the opening of the second plate portion and towards the first plate portion 2.

A spring 7 is placed around the first end portion 6, which is a bolt in this particular embodiment. A first end of the spring 7 is located at the second plate portion 3, whereas a second end of the spring 7 is located at the disk 8. The spring 7 is thereby trapped between the disk 8 and second plate portion 3. When the first force is applied to the ejector rod 5, which will result in the first end portion 6 being pushed towards the first plate portion 2 and the spring 7 will be compressed. A compression of the spring 7 will provide a second force onto the second plate portion of the ejector plate 3, which will cause a motion of the ejector plate relatively to the core plate 1. The ejector pins 13a, 13b will thereby be pushed through the openings in the front surface of the core plate 1, as depicted in FIG. 1b. Hence, an indirect coupling is achieved between the first end portion 6 and the ejector plate 2, 3, namely by ease of the spring.

The person skilled in the art will appreciate that FIG. 1b depicts the situation in which the distance block 9 is in contact with the backside of the front surface of the core plate 1, meaning that the ejector plate 2, 3 is moved as far to the backside of the front surface of the core plate 1 as possible. In this situation, the gap 12 between the first plate portion 2 and the first end portion 6, for example the bolt, is reduced compared to the initial situation depicted in FIG. 1a but is non-zero. Hence, the first end portion 6 is not in contact with the first plate portion 2 and the abrupt stop of the ejector plate 2, 3 upon impact of the distance block 9 at the backside of the front surface of the core plate 1 does not cause an abrupt stop of the motion of the ejector rod 5 and therefore not a force onto the moving means (not shown), which would cause an abrupt stop of the moving means, which may lead to a damage of the moving means.

Further, the compression of the spring may also result in a restoring force, which has the opposite direction of the first force. If the restoring force exceeds the first force, the restoring force provided by the spring 7 will cause a return of the ejector plate to its initial position.

Figure 2:
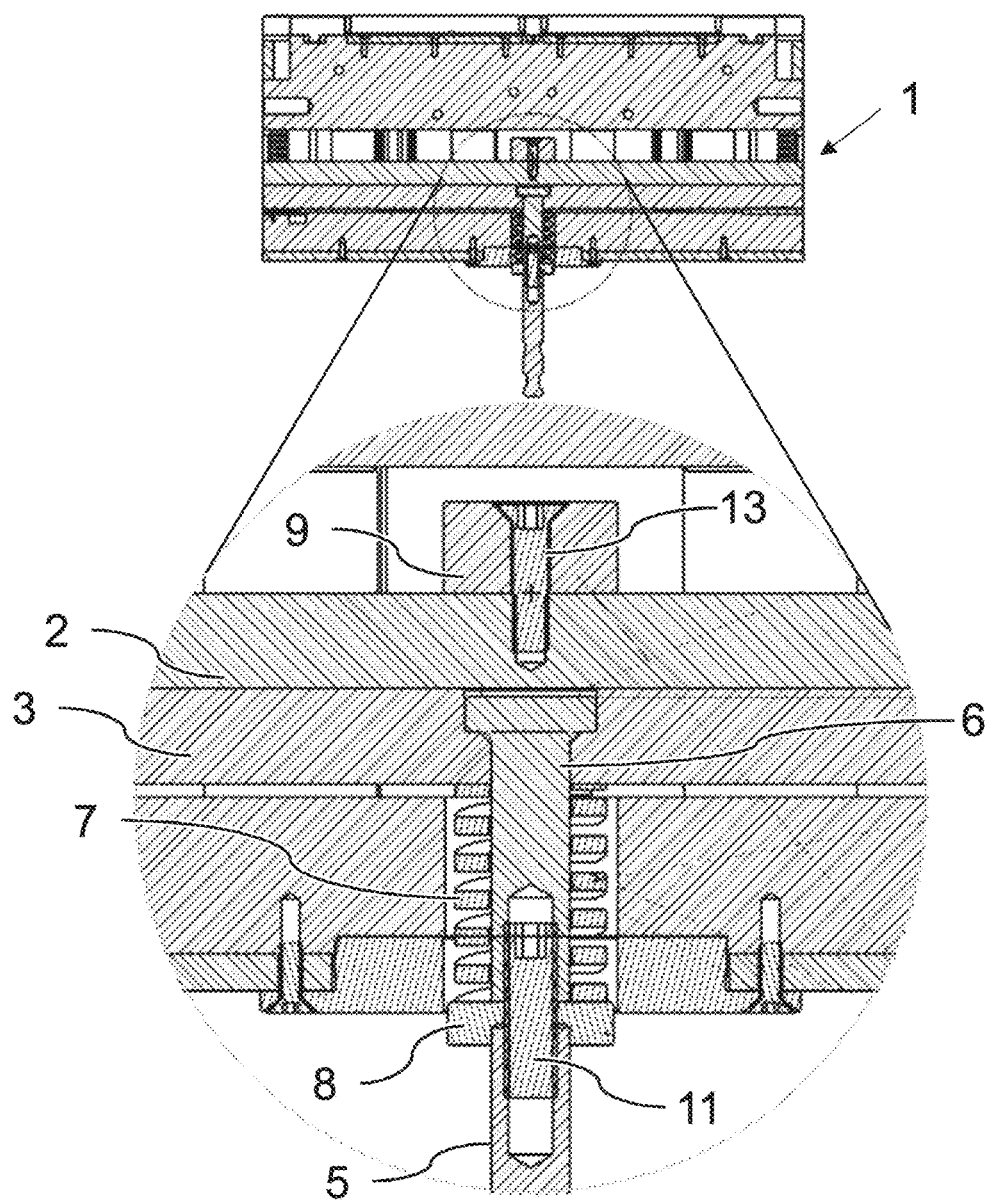
FIG. 2 shows a detail image of the cross-sectional view of an embodiment of a core plate according to an embodiment.

FIG. 2 shows a detailed image of a cross-sectional view of an embodiment of a core plate 1 according to the present disclosure. In the upper part of FIG. 2, an embodiment of a core plate 1 is shown. The embodiment may be the embodiment depicted in FIG. 1. The lower part of FIG. 2 shows the portion of the upper part of FIG. 2, which is highlighted with a circle, in more detail. The detailed view corresponds to a detail view of a portion of the ejector according to the present disclosure.

In the center, the first end portion 6 comprising a bolt is coupled to an ejector rod 5 via a disk 8 and an insert 11. A first end portion of the bolt is located within an opening of a second plate portion 3 of the ejector. The bolt is movable within the opening, so that a gap 12 is formed between the first end portion of the bolt and a first plate portion of the ejector. The configuration depicted in FIG. 2 is an initial position of the ejector.

A distance block 9 is attached to the first plate portion 2 and is secured with a fastening means 14. The fastening means 14 may, for example, be a screw, a nail, a spike, a bolt, a pin, or any equivalent.

Figure 3:
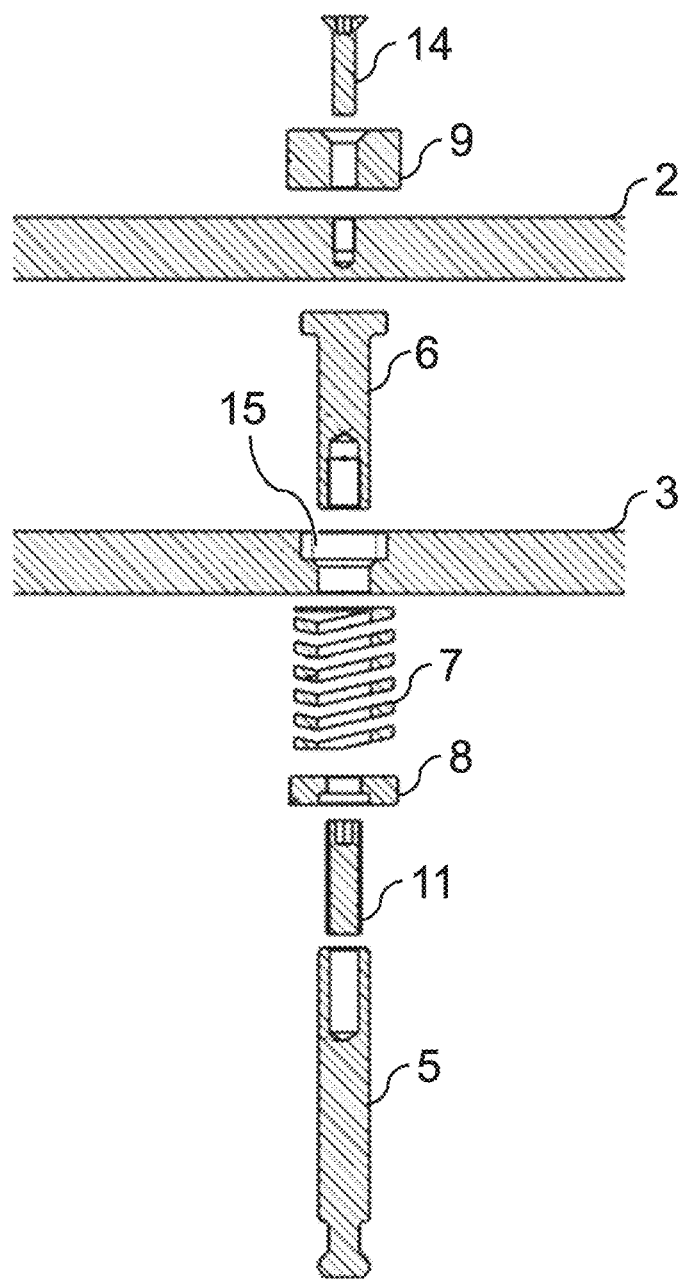
FIG. 3 shows an exploded view of an embodiment of the ejector according to an embodiment.

FIG. 3 shows an exploded view of an embodiment of the ejector according to the present disclosure, in particular according to the embodiment depicted in FIG. 2. From top to bottom, a fastening means 15 for securing a distance block 9 at a first plate portion 2, the distance block 9, the first plate portion 2, a bolt, a second plate portion 3 with opening 15, a spring 7, a disk 8, an insert 11 and an ejector rod 5 are shown.

In the embodiment depicted in FIG. 3, upon assembly of the ejector, the bolt is placed between the first and second plate portions 2, 3 of the ejector plate and guided through opening 15. After assembly, the bolt 6, which has a first end portion with a greater diameter than the remainder of the bolt, is trapped within the opening 15 of the second plate 3 with its first end portion. As can be seen in the assembled view depicted in FIG. 2, the first end portion of the bolt is movable within the opening in a normal direction to the surface of the second plate portion 3. A motion of the bolt within the opening 15 reduces or increases the gap 12 between the first end portion of the bolt and the first plate portion 2.

After assembling the bolt and the two plate portions 2, 3, the spring 7 is placed around the bolt and secured with the disk 8, insert 11 and ejector rod 5, so that the spring 7 is located around the bolt and trapped between the second plate portion 3 and the disk 8.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the scope of the appended claims.

The invention claimed is:

1. An ejector comprising:
   an ejector plate having an opening and a distance block attached to the ejector plate configured to limit motion of the ejector plate;
   an ejector rod comprising a first end portion and a second end portion, wherein the first end portion is located in the opening of the ejector plate, wherein the ejector rod has a first initial position relative to the ejector plate, and wherein the first end portion of the ejector rod is configured to be pushed in a direction of the ejector plate by a first force applied to the second end portion of the ejector rod; and
   a spring placed around the first end portion of the ejector rod and coupled to the ejector plate, wherein the spring is configured to provide a second force to the ejector plate upon application of the first force to the second end portion of the ejector rod, thereby causing a motion of the ejector plate and wherein a non-zero gap is always maintained between the first end portion of the ejector rod and the ejector plate.

2. The ejector according to claim 1, wherein the gap between the first end portion of the ejector rod and the ejector plate decreases when the ejector rod is moved from the first initial position in the direction of the ejector plate.

3. The ejector according to claim 2, wherein the ejector plate comprises a first plate portion and a second plate portion, wherein the second plate portion comprises the opening of the ejector plate and wherein the gap is located between the first end portion of the ejector rod inside the opening and the first plate portion of the ejector plate.

4. The ejector according to claim 3, wherein the first end portion of the ejector rod is movable within the opening of the second plate portion towards the first plate portion or away from the first plate portion, respectively, and a motion of the first end portion of the ejector rod within the second plate portion causes a reduction in size of the gap when the first end portion of the ejector rod is moved towards the first plate portion or an increase of the size of the gap when the first end portion of the ejector rod is moved away from the first plate portion.

5. The ejector according to claim 1, wherein the first end portion is formed by a bolt, which is attached to the ejector rod.

6. The ejector according to claim 5, wherein the bolt is attached to the ejector rod via a disk, and wherein the spring is placed around the first end portion and is located around the bolt between a second plate portion and the disk.

7. The ejector according to claim 1, wherein the spring is configured to provide a restoring force to the ejector plate, which causes the ejector rod to return to the first initial position after being pushed in the direction of the ejector plate.

8. The ejector according to claim 1, wherein the ejector comprises at least one ejector pin extending from the ejector plate.

9. A molding machine comprising:
- a core plate comprising a first part of a means for forming a cavity and an ejector according to claim 1; and
- a cavity plate-having a second part of the means for forming a cavity, wherein the first part and the second part form a cavity between the core plate and the cavity plate when the core plate and the cavity plate are pushed together.

10. The molding machine according to claim 9, wherein the cavity plate is fixed within the molding machine and the core plate is movable relative to the cavity plate.

11. The molding machine according to claim 9, wherein the ejector comprises at least another spring, which is attached to the ejector plate and provides a restoring force, which causes the ejector plate to return to a second initial position relative to the core plate.

12. A method comprising:
- providing a first force to an ejector rod of an ejector, wherein the ejector rod comprises a first end portion and a second end portion is coupled to an ejector plate via a spring placed around the first end portion of the ejector rod;
- compressing the spring attached to a portion of the ejector rod, wherein the compressing is caused by the first force applied to the second end portion of the ejector rod;
- providing a second force to the ejector plate by compressing the spring and thereby moving the ejector plate of the ejector; and
- reducing a size of a gap between the first end portion of the ejector rod and the ejector plate to a minimum upon providing the first force to the ejector rod, wherein the size of the gap is always non-zero.

13. The method according to claim 12, wherein at least one ejector pin is attached to the ejector plate, the method further comprising:
- moving the at least ejector pin into a means for forming a cavity of a molding machine, wherein the movement of the at least one ejector pin is caused by moving the ejector plate.

14. The method according to claim 12, further comprising:
- limiting movement of the ejector plate of the ejector by providing a distance block attached to the ejector plate.

15. The method according to claim 12, further comprising:
- providing-a restoring force to the ejector rod via the spring, wherein the restoring force is directed opposite to the first force; and
- increasing the size of the gap by a motion of the ejector rod caused at least partially by the restoring force provided by the spring.

* * * * *